United States Patent [19]

Yang

[11] Patent Number: 5,474,455

[45] Date of Patent: Dec. 12, 1995

[54] MATHEMATICAL CALCULATION BOARD GAME AND METHOD OF PLAYING

[76] Inventor: Jinxian Yang, 29-6-1-1 Xinhua Xijie, Yili, Xinjiang, China

[21] Appl. No.: 971,591

[22] Filed: Nov. 5, 1992

[30] Foreign Application Priority Data

Nov. 8, 1991 [CN] China ........................ 91110470.4

[51] Int. Cl.⁶ .................................................. G09B 19/22
[52] U.S. Cl. ...................... 434/128; 434/191; 434/209; 273/272; 273/236
[58] Field of Search ........................ 434/188, 191, 434/205, 209, 208, 207, 128; 273/272, 236

[56] References Cited

U.S. PATENT DOCUMENTS

| | | | |
|---|---|---|---|
| D. 91,967 | 4/1934 | Saxmann | 273/236 X |
| 3,396,972 | 8/1968 | Smith | 273/272 |
| 3,744,153 | 7/1973 | Van Es | 273/272 |
| 3,844,568 | 10/1974 | Armstrong | 273/272 |

FOREIGN PATENT DOCUMENTS

| | | | |
|---|---|---|---|
| 88106104.2 | 10/1989 | China . | |
| 89109251.X | 4/1991 | China . | |
| 2658428 | 8/1991 | France | 273/272 |
| 2121692 | 1/1984 | United Kingdom | 273/272 |

*Primary Examiner*—Gene Mancene
*Assistant Examiner*—Jeffrey A. Smith
*Attorney, Agent, or Firm*—Popham, Haik, Schnobrich & Kaufman, Ltd.

[57] ABSTRACT

A mathematical calculation board game comprises 128 playing pieces and a game board having 144 squares. The playing pieces are arranged on the game board according to certain game rules. The game board is divided into "blue" and "red" sides and is marked with red, blue, purple, white and orange game squares. Fifty squares contain the operators $+, -, \times, \div$. Each operator square has a blue square on one side of it and a red square on the other side. The operator squares are arranged in four files vertically and ten rows transversely. Ten purple squares are arranged transversely to divide the game board into its blue and red portions. There are 51 red game pieces, 51 blue ones, 10 purple ones, 10 white ones, and 6 orange ones. One red and one blue piece are marked with a "–". The remaining pieces are marked with numbers or numerical expressions. The players place the purple and white pieces on the purple and white squares, respectively; the red and blue "–" sign pieces on the red and blue "–" sign squares, respectively; and the red and blue numerical pieces on the red and blue squares, respectively. Each pair of red and blue pieces connected by an operator square forms a longitudinally or transversely arranged mathematical calculating problem. The 25 calculating problems on each side of the boundary are calculated by the player sitting on that side of the game board and the answers calculated by each player are added together as his score.

24 Claims, 2 Drawing Sheets

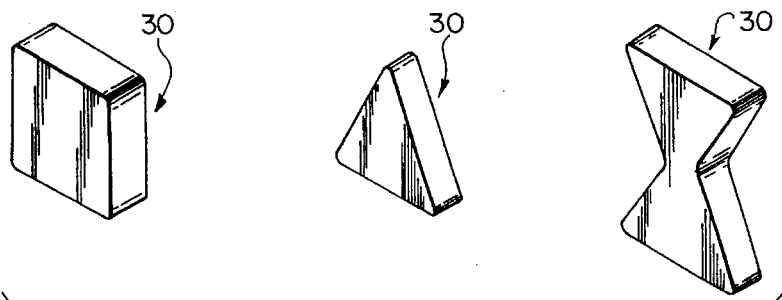
FIG. 2
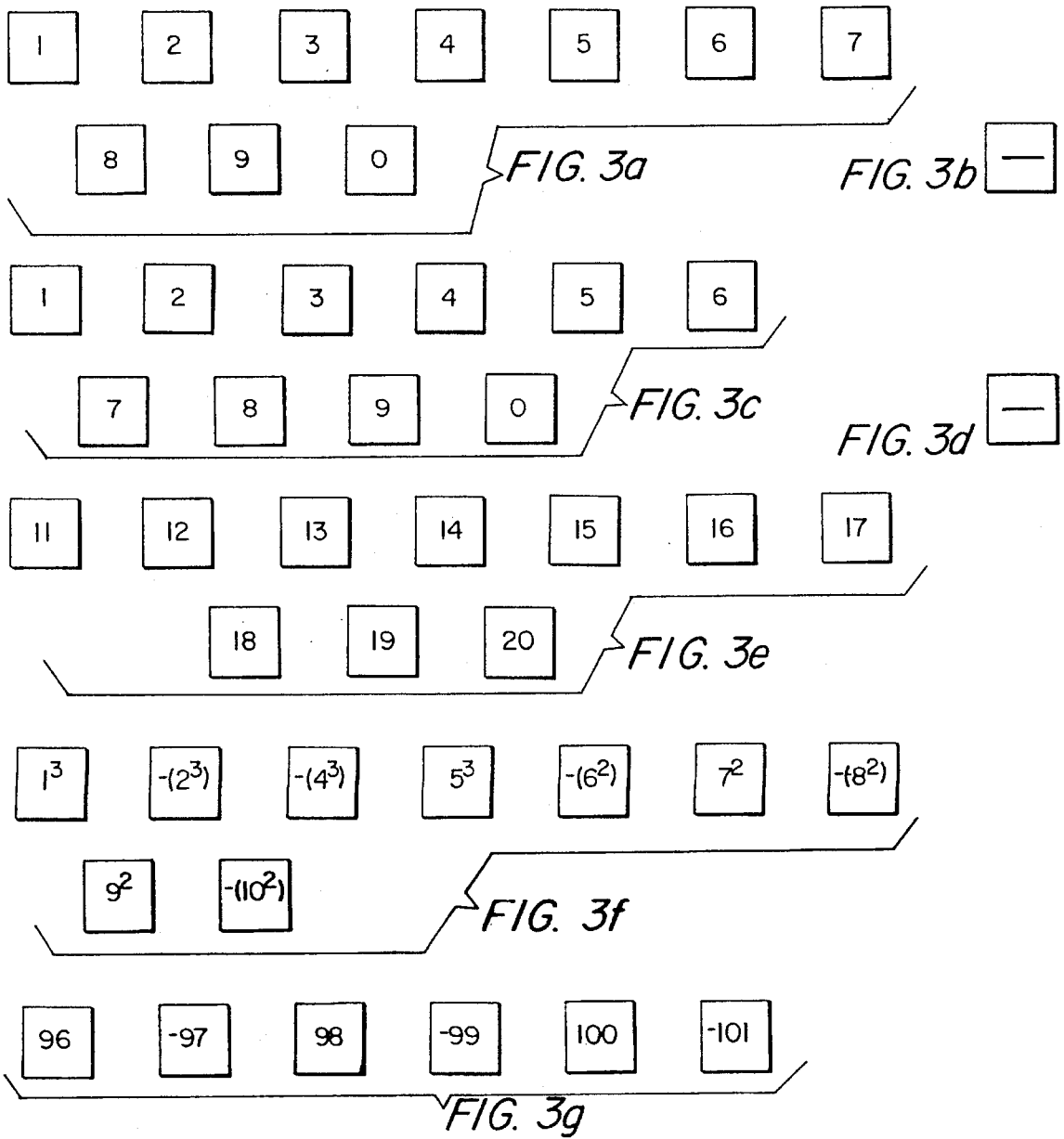
FIG. 3a  FIG. 3b
FIG. 3c  FIG. 3d
FIG. 3e
FIG. 3f
FIG. 3g

MATHEMATICAL CALCULATION BOARD GAME AND METHOD OF PLAYING

FIELD OF THE INVENTION

The present invention relates to a board game, and more particularly, to a mathematical board game to be played by primary school students, high school students, undergraduates, family members and elders and youngsters.

DESCRIPTION OF THE PRIOR ART

Mathematical calculation board games are a form of entertainment to be played in accordance with certain playing rules involving mathematical calculation rules. The most relevant prior art mathematical calculation board games to the present invention are the pending Chinese applications for patents for invention entitled "Primary School Students' Mathematical Calculation Chess" (application no. 88106104.2, filed Aug. 8, 1988) and "Interesting Mathematic Calculation Chess" (application no. 89109251.x, filed Dec. 7, 1989) filed by Ms. Lin Ming and Jinxian Yang, the inventor of the present invention.

The above-mentioned "Primary School Student's Mathematic Calculation Chess" comprises 90 pieces, and involves the manipulation of the mathematical calculation rules of addition, subtraction, multiplication and division of positive integers. It is mainly suitable for the psychological characteristics of primary school students and the mathematical knowledge acquired by them. Interest in learning mathematics and the calculating skills of students can be cultivated by playing this board game.

The above-mentioned "Interesting Mathematic Calculation Chess" is an improvement of the "Primary School Student's Mathematic Calculation Chess." It comprises 170 pieces, and besides the addition, subtraction, multiplication and division of positive integers mentioned above, it also involves questions relating to geography, nature, mankind and animals, science, politics and military, jewelry, and sports and art, and therefore, this board game is more interesting.

Due to the constraints of the arrangement of the pieces and the playing rules of the above-described two board games, only the addition of single digit numbers, two-digit numbers and three-digit numbers, as well as substraction, multiplication and division of single digit numbers can be performed because they lack the mathematical calculation skills of students in higher grades.

SUMMARY OF THE INVENTION

It is an object of the present invention to provide a mathematical board game with more complicated mathematical calculation rules and a higher level of interest and entertainment than that of the above-mentioned prior art. Specifically, the mathematical calculation functions involved in the mathematical calculation board game of the present invention are further expanded by providing more playing pieces and modifying the corresponding game board.

The mathematical calculation board game according to the present invention comprise 128 playing pieces and a game board having 144 squares. In the game, the following calculations can be performed:

The addition of single digit to five-digit numbers; the subtraction, multiplication and division of single digit, two-digit and three-digit numbers; squaring of single digit through three-digit numbers; cubic calculation of single digit numbers; as well as addition, subtraction, multiplication and division of positive and negative numbers of single digit, two-digit and three-digit numbers. Thus, students in the upper grades of primary school and high school as well as college undergraduates will play this game with great interest. In addition, it has been proved in practice that this game is also advantageous for promoting the study of mathematics by high school and primary school students and the development of their intellect; therefore it is not only an enriching entertainment game but also a very inexpensive and effective auxiliary tool for mathematics education.

BRIEF DESCRIPTION OF THE DRAWINGS

FIG. 2 is a perspective view of the shapes of the game pieces.

FIGS. 3a–3g are plan views of the faces of the game pieces.

DETAILED DESCRIPTION OF THE PRESENT INVENTION

Figure 1:
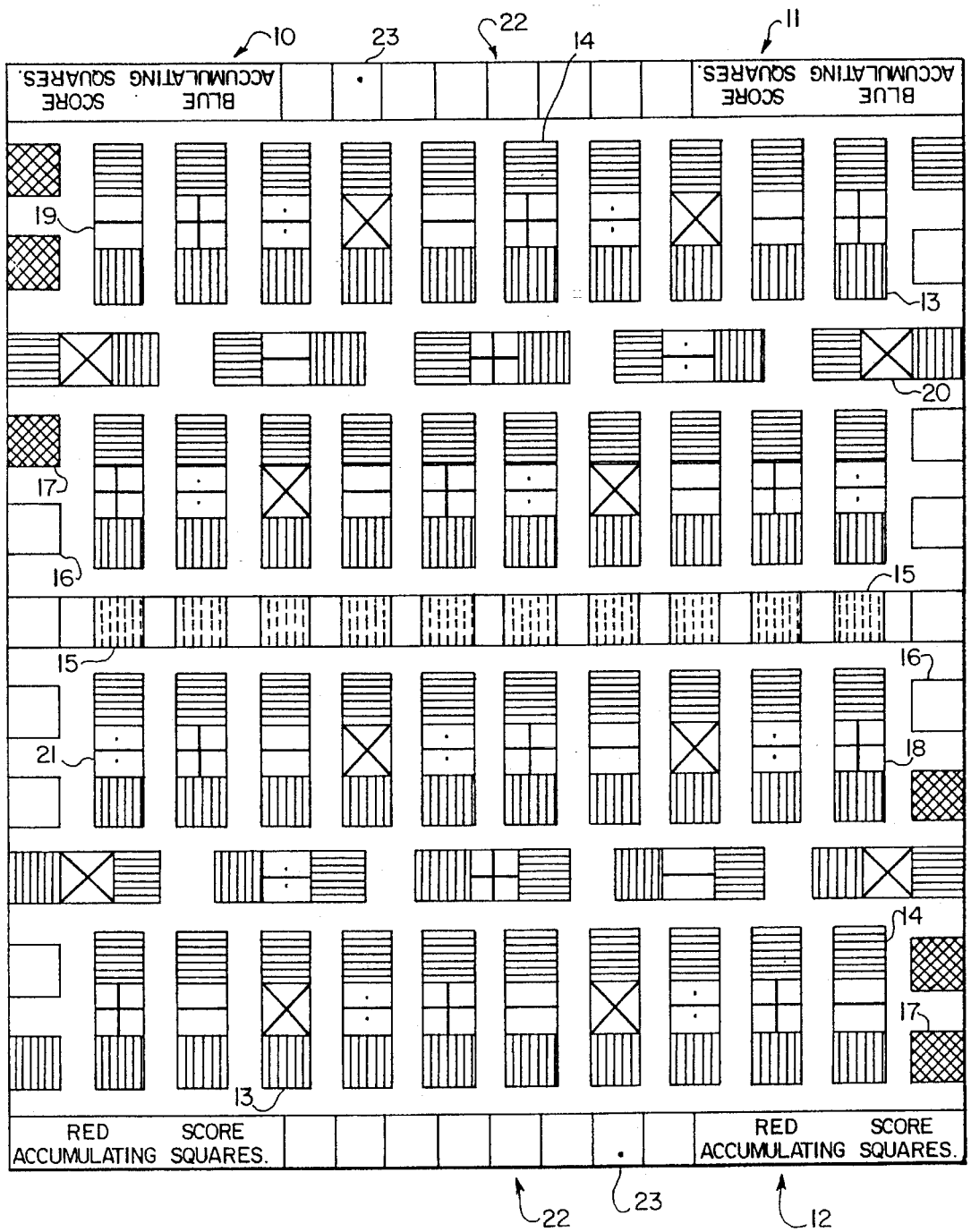
FIG. 1 shows a game board in accordance with the present invention.

The mathematical board game of the present invention comprises a game board (10) and certain kinds and numbers of playing pieces (30).

The playing pieces are arranged on the game board according to certain game rules. As shown in FIG. 1, the game board is divided into a "blue" side (11, at the top of FIG. 1) and a "red" side (12, at the bottom of FIG. 1) and is marked with game squares of five colors; red (13), blue (14), purple (15), white (16) and orange (17), Fifty squares contain the operators +(18), −(19), ×(20) and ÷(21), respectively.

Sixteen squares (22) in total and eight for each of the red and blue sides are transversely arranged in the top and bottom rows of the game board, for the accumulated scores for the red and blue sides of the board. One of these squares on each side can be marked with a dot (23) representing a decimal point, as will be explained in detail hereafter.

Each operator square has a blue square on one side of it and a red square on the other side of it. Calculation problem square patterns are defined by connected red operand, operator, and blue operand squares, and are arranged in four files vertically and ten rows transversely, two files and five rows being located in the upper (blue) portion of the game board, and two files and five rows being located in the lower (red) portion of the game board.

Ten purple squares are arranged transversely between two white squares each at the left and right sides of the middle portion of the game board, to divide the game board into its upper (blue) and lower (red) portions or sides.

One "−" sign square, five white squares, three orange squares, one red square, and one blue square are arranged vertically in each side file of the game board, there being one red square and one blue square for each side. There are in total 22 such colored squares arranged vertically in the side files.

As shown in FIG. 2, the game pieces are in the shape of a square or ⟨ or "Δ" shaped, and are 2 cm in length, 2 cm in width and 0.8 cm in thickness (although the size can be reduced or expanded in proportion according to the requirements of the game). As will be described in greater detail, there are 128 game pieces, which when arranged on the game board in accordance with the rules described below are fully identical in size, shape and color with the squares on which they are positioned.

Of the 128 game pieces, there are 51 red pieces; 51 blue ones; 10 purple ones; 10 white ones; and 6 orange ones.

The surface of a piece marked with a number or a numerical expression is referred to as the face of the piece, while the opposite surface is referred to as the back of the piece.

As shown in FIG. 3a, there are fifty red game pieces, five each of which are marked with the numbers 1, 2, 3, 4, 5, 6, 7, 8, 9, and 0.

As shown in FIG. 3b, there is one red piece marked on both surfaces with a "–".

As shown in FIG. 3c, there are fifty blue game pieces in total, five each of which are marked with the numbers 1, 2, 3, 4, 5, 6, 7, 8, 9, and 0.

As shown in FIG. 3d, there is one blue piece marked on both surfaces with a "–38 .

As shown in FIG. 3e, there are ten purple game pieces in total, one each of which is marked with the numbers 11, 12, 13, 14, 15, 16, 17, 18, 19 and 20.

As shown in FIG. 3f, there are ten white game pieces in total, one each of which is marked with the numerical expression $1^3, 3^3, -(4^3), 5^3, -(6^2), 7^2, -(8^2), 9^2$ and $-(10^2)$.

As shown in FIG. 3g, there are six orange game pieces in total, one each of which is marked with the numbers 96, –97, 98, –99, 100 and –101.

The two players sit facing each other with the game board placed longitudinally between them. The player sitting in front of the upper (blue) portion is designated the blue player and the player sitting in front of the lower (red) portion is designated the red player. The players put the purple, white and orange game pieces with their faces facing downward and their backs facing upward, and the red, blue and "–" sign pieces with their faces facing upward. After mixing the pieces thoroughly, the players randomly place the purple pieces on the purple squares with their backs facing upward, the white pieces on the white squares with their backs facing upward, the red "–" sign piece on the red "–" sign square, and the blue "–" sign piece on the blue "–" sign square.

The red player stands all the red pieces, except the red "–" sign piece, on all the red squares of the game board with their faces toward the red player himself, and the blue player stands all the blue piece, except the blue "–" sign piece, on all the blue squares of the chess board with their faces toward the blue player himself. After the pieces have been positioned by both players, all the pieces on the longitudinally arranged pairs of upper (front or blue) and lower (rear or red) squares a mathematical operator appear in a standing state with their faces opposite to each other, and the pieces on the pairs of red and blue squares arranged transversely and connected by operators in left-right directions are] a mathematical operator in a left-to-right orientation, appear in a standing state with their faces toward the front and rear directions, respectively. Each pair of red and blue pieces connected by an operator square forms a longitudinally or transversely arranged mathematical calculating problem (referred to as a calculating problem hereafter), respectively.

With the row of twelve pieces two white pieces and ten purple pieces) in the middle of the game board as a boundary, the 25 calculating problems on each side of the boundary are to be calculated by the player sitting on that side of the game board and the answers calculated by each player are added together as his score. During the playing of a game, the two players alternately solve one problem at a time, working from left to right and from the lower row to the upper row with the red player taking the first problem to be solved. Before each calculation, the player whose turn it is to calculate should lay down the two pieces of the problem to be calculated by himself on their original squares and then calculates the answer to the problem. The result of calculation of each problem obtained by each player is added to his previous score, if there is any, in the player's squares for accumulating score. The numbers representing the player's score are arbitrarily taken from the standing or laid-down pieces on either side of the middle boundary of the game board. For example, if the red player initially has a score of zero in his score accumulating squares, and he obtains an answer of "1" for his first calculating problem, then the score is "1" and the red player takes a red piece marked with a "1" from one of the red operand squares and places it in the accumulating square to the left of the decimal point. If the red player already has an accumulated score of "9" in his score accumulating squares and he obtains an answer of "9" for his next calculating problem, then his accumulated score is "18" and he takes two red pieces, one marked with a "1" and another marked with and "8" from the red operand squares. The pieces which represent the new score are placed in the score accumulating squares with their faces facing upward, and the pieces which represent the previous score are placed into the red operand squares left empty by the pieces representing the new score. If no new piece is taken to represent the new score (i.e, if there is no score piece which requires replacement on the game board), or if there are still empty red operand squares on the game board after the pieces representing the previous score have all been replaced on empty red operand squares, then a number of purple, white or orange pieces equal to the number of empty red operand squares are taken by the red player to fill in the remaining empty red operand squares. On the other hand, if the number of pieces in the score accumulating squares which are being replaced exceeds the number of empty red operand squares, then the left over pieces are used to arbitrarily replace any purple, white or orange pieces which have been placed on red operand squares, and the replaced purple, white or orange pieces are returned to squares of their own color. Purple, white or orange pieces which have been placed in empty red operand squares are used as red pieces. The above rules are also applicable to the blue player, the blue player taking blue pieces from blue operand squares to represent his accumulated score in his score accumulating squares, and replacing pieces taken from blue operand squares with blue pieces as available, and otherwise with purple, white or orange squares. The player having the higher accumulated score is the winner of a game after all 25 calculating problems have been calculated in turn by both players in accordance with the above mentioned rules and the following modifications.

Modifications

1. When teenagers (i.e., university undergraduates, high school students, etc.) play this game, the numbers marked on a player's own pieces are always used as the minuend and dividend in subtraction and division. If the divisor happens to be a zero, the player may substitute for it a piece arbitrarily chosen from pieces of the same color (i.e., from the opposite player's pieces), with the back of the piece facing him from the opposite player's calculating problem squares. If the substituted piece is still a zero, he may change it again until a non-zero piece is obtained. When indivisible numbers are encountered they can be rounded into integers or one digit of the fractional part may be reserved and placed to the right of the decimal point square in the score accumulating squares. When pieces of colors other than other than a player's own have to be used to fill that player's empty operand squares, white piece or orange pieces are preferably used to maintain the complexity of the calculation. The red and blue "−" sign pieces on the game board can be placed in the leftmost square of a player's score accumulating squares for negative scores.

2. When children (i.e. students in lower grades) play this game, the greater number is used as the minuend in subtraction and the dividend in division, and zero is used as the dividend when it is encountered in division. When both pieces in a division problem are zero, the zero piece of the player's own color is to be replaced by a piece of the player's own color marked with the smallest non-zero number as divisor, while the other zero piece is used as the dividend. When indivisible numbers (i.e., numbers which are not evenly divisible) are encountered, the piece of the player's own color can replaced (interchanged) with a piece of the same color which makes the problem divisible. For students who already know how to round a number, they may take the rounded integer as the result. Thus, if both players know how to round a number, it is no longer necessary to replace (interchange) the piece of the player's own color to make the problem evenly divisible. If it is necessary to take pieces from squares with colors other than that of a player's own to fill empty operand squares, the player usually should take the purple pieces. Of course, if after a period of game training, the players have reached the playing level of undergraduates and high school students, they may play the game in accordance with the above mentioned Modification 1.

3. When little boys or girls (i.e. first grade students, primary school students or kindergartners) play the game (usually with the assistance of teachers or parents), the smaller number is always subtracted from the larger number in subtraction; and addition is used to replace multiplication and division. If it is necessary to take pieces from those squares other than the squares of the player's own color to fill the player's empty operand squares, usually purple pieces should be taken.

In a board game in accordance with the invention, winning involves not only chance, but also a full scale battle of wits as to the strategic arrangement of the pieces and replacement and placement of the pieces, because in this board game, the score is attributed to the player whose turn it is to calculate. Therefore, a player should replace (or interchange) the playing pieces in his score accumulating squares with playing pieces of his own color which are marked with higher numbers and which are placed on the opposite player's addition and multiplication problems; while replacing (interchanging) the playing pieces in his own score accumulating squares with playing pieces of his own color marked with lower numbers and which are placed on his own addition and multiplication problems. This makes the outcome of the game depend on strategy, rather than chance.

I claim:

1. A mathematical calculation game comprising a board having a top, a bottom, a left side, and a right side and including:

a plurality of middle boundary squares extending transversely in a row approximately midway between said top and said bottom and dividing said board into an upper portion and a lower portion;

a plurality of score accumulating squares arranged in said upper portion and a plurality of score accumulating squares arranged in said lower portion;

a plurality of mathematical operator squares arranged transversely in an equal number of rows in said upper portion and said lower portion, each of said mathematical operator squares having a mathematical operator marked thereon, wherein a first row of mathematical operator squares is adjacent said top, a second row of mathematical operator squares is adjacent said bottom, third and fourth rows of mathematical operator squares are on either side of said middle boundary squares, a fifth row is intermediate said first row and said third row, and a sixth row is intermediate said second row and said fourth row, and wherein for some of said rows of mathematical operator squares, said sets of calculating squares extend longitudinally of said board, and for the other of said rows of mathematical operator squares, said sets of calculating squares extend transversely of said board; and a plurality of mathematical operand squares arranged in pairs, with one of each of said mathematical operator squares interposed between said mathematical operand squares in each pair, each said mathematical operator square and associated pair of mathematical operand squares defining a set of calculating squares.

2. The game of claim 1, wherein said sets of calculating squares including said first, second, third, and fourth rows of mathematical operator squares extend longitudinally of said board, and said sets of calculating squares including said fifth and sixth rows of mathematical operator squares extend transversely of said board.

3. The game of claim 2, wherein there are 10 of said middle boundary squares, 50 of said mathematical operator squares, and 100 of said mathematical operand squares.

4. The game of claim 1, wherein a plurality of scoring piece squares are arranged vertically in rows adjacent said left and right sides.

5. The game of claim 1, wherein there are 10 of said middle boundary squares, 50 of said mathematical operator squares, and 100 of said mathematical operand squares.

6. The game of claim 1, further comprising a plurality of mathematical operand playing pieces corresponding in number to said plurality of mathematical operator squares and having single digit numbers marked thereon, and a plurality of scoring playing pieces corresponding in number to said plurality of middle boundary squares and having two-digit numbers marked thereon.

7. The game of claim 1, wherein said score accumulating squares are arranged transversely in a row at said top and said bottom.

8. A mathematical calculation game comprising a board having a top, a bottom, a left side, and a right side and including:

8 score accumulating squares arranged transversely in a row at said top and 8 score accumulating squares arranged transversely in a row at said bottom;

10 middle boundary squares extending transversely in a row approximately midway between said top and said bottom and dividing said board into an upper portion and a lower portion;

50 mathematical operator squares arranged transversely in 3 rows in said upper portion and 3 rows in said lower portion, each of said mathematical operator squares having marked thereon one of the mathematical operators "+", "−", "×", and "÷";

100 mathematical operand squares arranged in pairs, with one of each of said mathematical operator squares interposed between said mathematical operand squares in each pair, each said mathematical operator square and associated pair of mathematical operand squares defining a set of calculating squares, 40 of said sets of calculating squares being arranged longitudinally and 10 of said sets of calculating squares being arranged transversely; and 9 scoring piece squares arranged longitudinally in a row adjacent said left side and 9 scoring piece squares arranged longitudinally in a row adjacent right side, one of said scoring piece squares on each side being in alignment with said row of middle boundary squares, and another one of said scoring piece squares on each side having a "–" sign marked thereon.

9. The game of claim 8, wherein said game further comprises a plurality of playing pieces including:

10 mathematical operand pieces having two-digit numbers marked thereon;

100 mathematical operand pieces having single-digit numbers marked thereon;

10 scoring pieces having a numerical expression marked thereon, said numerical expression comprising a number between 1 and 10 raised to a power, wherein said power is a number chosen from the group consisting of the numbers 2 and 3, at least one said numerical expression being positive and at least one said numerical expression being negative; and 6 scoring pieces each having a multi-digit number marked thereon, at least one said multi-digit number being positive and at least one said multi-digit number being negative.

10. The game of claim 9, wherein all of said middle boundary squares and said middle boundary scoring pieces are a first color, 50 of said mathematical operand squares and 50 of said mathematical operand pieces are a second color, 50 of said mathematical operand squares and 50 of said mathematical operand pieces are a third color, 5 of said scoring piece squares on each side of said board and 10 of said scoring pieces are a fourth color, and 3 of said scoring piece squares on each side of said board and 6 of said scoring pieces are a fifth color.

11. The game of claim 9, wherein 10 of said scoring pieces have the mathematical expressions $1^3$, $-(2^3)$, $3^3$, $-(4^3)$, $5^3$, $-(6^2)$, $7^2$, $-(8^2)$, $9^2$, and $-(10^2)$, respectively, marked thereon.

12. The game of claim 11, wherein 6 of said scoring pieces have the numbers 96, –97, 98, –99, 100, and –101, respectively, marked thereon.

13. A method of playing a mathematical calculation game, comprising the steps of:

(a) providing a board having a top, an upper portion adjacent said top, a bottom, a lower portion adjacent said bottom, a left side, and a right side and including a plurality of mathematical operator squares arranged transversely in an equal number of rows in said upper portion and said lower portion, each of said mathematical operator squares having a mathematical operator marked thereon, a plurality of mathematical operand squares, a plurality of score accumulating squares, and a plurality of additional squares, the mathematical operand squares being arranged in pairs, with one of each of said mathematical operator squares interposed between said mathematical operand squares in each pair, each said mathematical operator square and associated pair of mathematical operand squares defining a set of calculating squares;

(b) providing a plurality of playing pieces including a plurality of mathematical operand pieces having numbers marked thereon and corresponding in number to said mathematical operand squares, and a plurality of scoring pieces corresponding in number to the additional squares;

(c) assigning a first player to the upper portion of the board and a second player is assigned to the lower portion of the board;

(d) placing one mathematical operand piece on each of the mathematical operand squares to define a mathematical calculation problem for each set of calculating squares and placing one scoring piece on each additional square; and (e) the first and second players alternately performing the mathematical calculation for one set of calculating squares in the portion of the board assigned to that player to obtain an answer until mathematical calculations have been performed for all of the sets of calculating squares, and each player representing his total score in the score accumulating squares in his corresponding portion of the board using the mathematical calculation pieces from his corresponding portion of the board, and replacing the mathematical calculation pieces placed in the score accumulating squares with a corresponding number of scoring pieces.

14. The method of claim 13, wherein said step (e) further comprises obtaining a score for each mathematical calculation which equals the answer to the mathematical calculation, and accumulating the scores for all of a players mathematical calculations to obtain a total score.

15. A mathematical calculation game comprising:

a board having a top, a bottom, a left side, and a right side and including:

a plurality of middle boundary squares extending transversely in a row approximately midway between said top and said bottom and dividing said board into an upper portion and a lower portion;

a plurality of score accumulating squares arranged in said upper portion and a plurality of score accumulating squares arranged in said lower portion;

a plurality of mathematical operator squares arranged transversely in an equal number of rows in said upper portion and said lower portion, each of said mathematical operator squares having a mathematical operator marked thereon; and a plurality of mathematical operand squares arranged in pairs on either side of each of said mathematical operator squares, each said mathematical operator square and associated pair of mathematical operand squares defining a set of calculating squares; and a plurality of playing pieces including:

a plurality of mathematical operand pieces having two-digit numbers marked thereon;

a plurality of mathematical operand pieces having single-digit numbers marked thereon equal in number to said plurality of mathematical operand squares;

10 scoring pieces having a marked thereon, said numerical expression comprising a number between 1 and 10 raised to a power, wherein said power is a number chosen from the group consisting of the numbers 2 and 3, at least one said numerical expression being positive and at least one said numerical expression being negative; and 6 scoring pieces each having a multi-digit number marked thereon, at least one said multi-digit number being positive and at least one said multi-digit number being negative.

16. The game of claim 15, wherein for some of said rows of mathematical operator squares, said sets of calculating squares extend longitudinally of said board, and for the other of said rows of mathematical operator squares, said sets of calculating squares extend transversely of said board.

17. The game of claim 16, wherein a first row of mathematical operator squares is adjacent said top, a second row of mathematical operator squares is adjacent said bottom, third and fourth rows of mathematical operator squares are on either side of said middle boundary squares, a fifth row is intermediate said first row and said third row, and a sixth row is intermediate said second row and said fourth row.

18. The game of claim 17 wherein said sets of calculating squares including said first, second, third, and fourth rows of mathematical operator squares extend longitudinally of said board, and said sets of calculating squares including said fifth and sixth rows of mathematical operator squares extend transversely of said board.

19. The game of claim 18, wherein there are 10 of said middle boundary squares, 50 of said mathematical operator squares, and 100 of said mathematical operand squares.

20. The game of claim 15, wherein a plurality of scoring piece squares are arranged vertically in rows adjacent said left and right sides.

21. The game of claim 15, wherein there are 10 of said middle boundary squares, 50 of said mathematical operator squares, and 100 of said mathematical operand squares.

22. The game of claim 15, further comprising a plurality mathematical operand playing pieces corresponding in number to said plurality of mathematical operator squares and having single digit numbers marked thereon, and a plurality of scoring playing pieces corresponding in number to said plurality of middle boundary squares and having two-digit numbers marked thereon.

23. The game of claim 15, wherein said score accumulating squares are arranged transversely in a row at said top and said bottom.

24. The game of claim 15, wherein a decimal point is provided in said plurality of score accumulating squares arranged in said upper portion and in said plurality of score accumulating squares arranges in said lower portion.

* * * * *